United States Patent
Grob-Lipski et al.

(10) Patent No.: US 10,404,599 B2
(45) Date of Patent: Sep. 3, 2019

(54) METHOD FOR OPERATING A RADIO COMMUNICATION NETWORK OR A NETWORK ELEMENT THEREOF USING BASEBAND UNIT SELECTION

(71) Applicant: Alcatel Lucent, Boulogne Billancourt (FR)

(72) Inventors: Heidrun Grob-Lipski, Stuttgart (DE); Bernd Haberland, Stuttgart (DE)

(73) Assignee: Alcatel Lucent, Nozay (FR)

( * ) Notice: Subject to any disclaimer, the term of this patent is extended or adjusted under 35 U.S.C. 154(b) by 67 days.

(21) Appl. No.: 15/314,602

(22) PCT Filed: May 20, 2015

(86) PCT No.: PCT/EP2015/061124
§ 371 (c)(1),
(2) Date: Nov. 29, 2016

(87) PCT Pub. No.: WO2015/185359
PCT Pub. Date: Dec. 10, 2015

(65) Prior Publication Data
US 2017/0214624 A1    Jul. 27, 2017

(30) Foreign Application Priority Data

Jun. 2, 2014  (EP) ..................... 14290160

(51) Int. Cl.
*H04L 12/803* (2013.01)
*H04L 12/931* (2013.01)
(Continued)

(52) U.S. Cl.
CPC ............ *H04L 47/125* (2013.01); *G06F 9/505* (2013.01); *G06F 9/5038* (2013.01);
(Continued)

(58) Field of Classification Search
CPC ... H04L 47/125; H04L 47/24; H04L 67/1012; H04L 67/1008; H04L 43/0882;
(Continued)

(56) References Cited

U.S. PATENT DOCUMENTS

2008/0165687 A1    7/2008   Wang

FOREIGN PATENT DOCUMENTS

EP    2 667 683 A1    11/2013
JP    2007-019724 A    1/2007
(Continued)

OTHER PUBLICATIONS

Bernd Haberland et al., "Radio Base Stations in the Cloud," Bell Labs Technical Journal, vol. 18, No. 1, pp. 129-152, XP055098994, Jun. 30, 2013.
(Continued)

*Primary Examiner* — Joshua Kading
(74) *Attorney, Agent, or Firm* — Fay Sharpe LLP (57) ABSTRACT

It is proposed a method for operating a radio communication network or a network element thereof, comprising the steps of: determining (2) a bearer to be processed in the radio communication network; selecting (4) a baseband unit, BBU, out of a plurality of BBUs, which satisfies at least one property of the bearer; and placing (8) the bearer on the selected BBU for processing.

13 Claims, 6 Drawing Sheets

(51) Int. Cl.
*G06F 9/50* (2006.01)
*H04W 28/08* (2009.01)
*H04L 12/26* (2006.01)
*H04L 12/851* (2013.01)
*H04L 29/08* (2006.01)
*H04W 24/08* (2009.01)
*H04W 72/04* (2009.01)
*H04W 72/08* (2009.01)
*H04W 72/12* (2009.01)
*H04W 88/08* (2009.01)
*H04W 28/18* (2009.01)

(52) U.S. Cl.
CPC ........ *G06F 9/5083* (2013.01); *H04L 43/0882* (2013.01); *H04L 43/16* (2013.01); *H04L 47/24* (2013.01); *H04L 49/50* (2013.01); *H04L 67/1008* (2013.01); *H04L 67/1012* (2013.01); *H04W 24/08* (2013.01); *H04W 28/08* (2013.01); *H04W 72/0486* (2013.01); *H04W 72/0493* (2013.01); *H04W 72/085* (2013.01); *H04W 72/1252* (2013.01); *H04W 72/1257* (2013.01); *H04W 28/18* (2013.01); *H04W 88/085* (2013.01)

(58) Field of Classification Search
CPC ............... H04W 28/18; H04W 72/085; H04W 72/0486; H04W 72/1257; H04W 72/1252; H04W 72/0493; G06F 9/505; G06F 9/5038; G06F 9/5083
See application file for complete search history.

(56) References Cited

FOREIGN PATENT DOCUMENTS

| | | |
|---|---|---|
| JP | 2007-318561 A | 12/2007 |
| JP | 2010-516183 A | 5/2010 |
| WO | WO 2013/072108 A1 | 5/2013 |

OTHER PUBLICATIONS

Bernd Haberland, "Smart Mobile Cloud," Retrieved from the internet www.netsys2013.de/documents/industry_track/Haberland_Smart_Mobile_Cloud.pdf, 28 pages, XP055098729, Mar. 14, 2013.
International Search Report for PCT/EP2015/061124 dated Jul. 22, 2015.

METHOD FOR OPERATING A RADIO COMMUNICATION NETWORK OR A NETWORK ELEMENT THEREOF USING BASEBAND UNIT SELECTION

FIELD OF THE INVENTION

The invention relates to a method for operating a radio communication network or a network element thereof.

BACKGROUND

Mobile cloud radio communication networks comprise a plurality of multi-site baseband pool units, MS-BBUs, each MS-BBU comprising a plurality of baseband units, BBUs, each BBU serving a plurality of remote radio heads, RRHs.

SUMMARY

By determining a bearer to be processed in the radio communication network, selecting a baseband unit, BBU, out of a plurality of BBUs, which satisfies at least one property of the bearer, and placing the bearer on the selected BBU for processing the Quality of Experience, QoE, requirements can be kept even placing the respective bearer on a baseband unit not serving the respective remote radio head the user equipment is connected to.

According to an embodiment a determination of the bearer comprises determining a processing capacity overload situation of a further BBU, determining the bearer being processed on the further BBU to be taken off the further BBU in dependence on the determined processing capacity overload situation of the further BBU.

According to an embodiment the determination of the processing capacity overload situation comprises: executing a number of processing capacity downgrade steps of at least one user specific function on the further BBU, determining the processing capacity overload situation depending on the number of processing capacity downgrade steps.

According to an embodiment at least one of the downgrade steps comprises: granting less processing capacity to a first group of user specific functions than to a second group of user specific functions.

According to an embodiment a total used processing capacity is determined, and one of the downgrade steps is executed based on a comparison of the total used processing capacity with a threshold value.

According to an embodiment the total used processing capacity is determined for a respective layer, especially a user specific physical layer and/or a medium access layer and/or a packet data convergence protocol, PDCP, layer and/or a radio link control, RLC, layer.

An embodiment comprises determining a first processing capacity prediction value for the at least one user specific function on the further BBU and for an upcoming transmission time interval, TTI, determining a second processing capacity prediction value for the at least one user specific function and for the upcoming transmission time interval, TTI, granting a processing capacity value to a user specific function based on the first and second processing capacity prediction values.

According to an embodiment the granted processing capacity is less than or equal to the second processing capacity prediction value, and wherein the first processing capacity prediction value is less than the second processing capacity prediction value.

According to an embodiment the first and second processing capacity prediction values are determined based on a number of physical resource blocks, PRBs, used for the user equipment of the user specific function per TTI, and/or based on the type of the modulation and coding scheme, and/or based on an antenna mapping, and/or based on an Quality of Experience Class Identifier, QCI, and/or based on a measured age of packets in a radio link control buffer, and/or based on a measured delay, and/or based on a maximum packet loss rate guaranteed, and/or based on a minimum bit rate guaranteed, respectively.

According to an embodiment the property of the bearer comprises latency between a user equipment associated with the bearer and the BBU and/or the property of the bearer comprises a guaranteed bit rate, GBR, and/or the property of the bearer comprises a Quality of Service, QoS, Class Indicator, QCI, and/or the property of the bearer comprises an end to end, E2E, packet drop rate, and/or the property of the bearer comprises a priority.

According to an embodiment the selection of the BBU comprises: gathering total processing capacity values from the plurality of BBUs, determining a processing capacity prediction value for the bearer on a cloud controller, and selecting the BBU based on a comparison of the total processing capacity values of the plurality of BBUs and the processing capacity prediction value for the bearer.

According to an embodiment the network element is a Baseband Unit, BBU, or a Cloud Controller.

BRIEF DESCRIPTION OF THE FIGURES

Further features, aspects and advantages of the present invention are given in the following detailed description with reference to the drawings in which.

DESCRIPTION OF THE EMBODIMENTS

Figure 1:
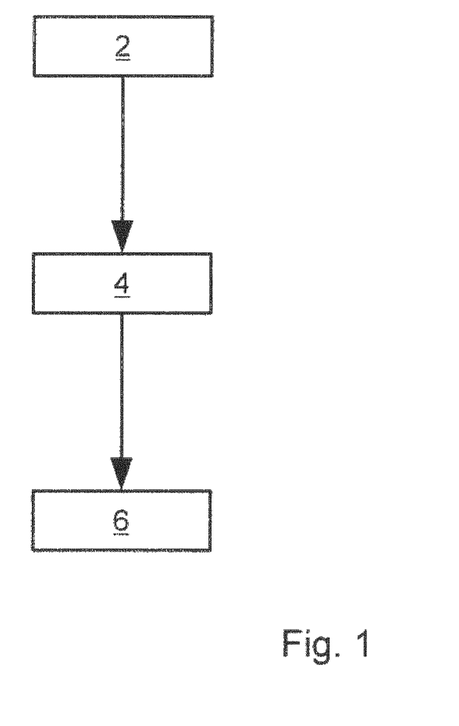
FIG. 1 is a schematic depiction of a method.

FIG. 1 is a schematic depiction of a method for operating a radio communication network or a network element thereof. In a first step 2 a bearer is determined to be processed in the radio communication network. In a second step 4 it is selected a baseband unit, BBU, out of a plurality of BBUs, which satisfies at least one property of the bearer. And in a third step the bearer is placed on the selected BBU for processing the bearer. The placement of the bearer comprises allocating or re-allocating of the bearer to the selected BBU. A bearer in the context of this disclosure is determined by a base station, especially in the form of a BBU or a MS-BBU or a mobile cloud comprising a plurality of BBUs, and a user equipment. The bearer carries at least one user specific data flow. The present disclosure is not limited to a downlink or uplink communication scheme but may be applied to both uplink and downlink, respectively.

Figure 2:
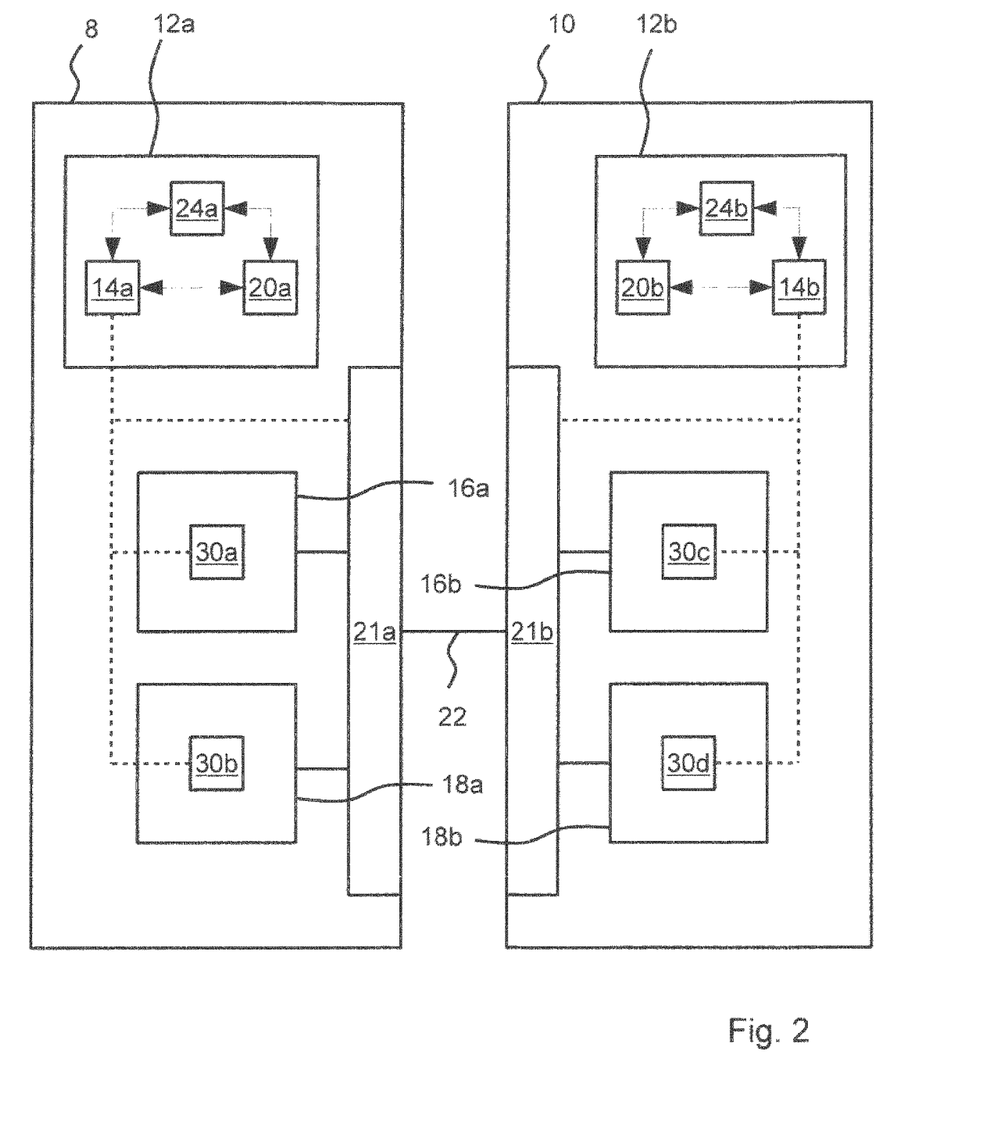
FIG. 2 is a schematic depiction of a first radio communication network.

FIG. 2 is a schematic depiction of a first radio communication network comprising two multi-site baseband units, MS-BBUs 8 and 10. The MS-BBU 8 comprises a decentralized cloud controller 12a. The decentralized cloud controller 12a comprises an intra resource manager 14a responsible for allocating bearers to BBUs 16a, 18a, the BBUs being connected to at least one of a plurality of remote radio heads, RRHs, not shown, respectively. The BBUs 16a, 18a may be also referred to as BBU modules. The decentralized cloud controller 12a further comprises an inter resource manager 20a, which performs resource pooling management of the BBU pool via a connection 22. The MS-BBUs 8 and 10 comprise a respective interface 21, especially an enhanced X2 interface, for the connection 22. A first BBU pool comprises the BBUs 16a and 18a, a second BBU pool comprises the BBUs 16b and 18b. A database 24 of the decentralized cloud controller 12a stores information required for decisions that of the intra resource manager 14a and the inter resource manager 20a.

Each BBU 16, 18 comprises a resource manager 30, respectively, which is responsible for granting processing capacity within the respective BBU 16, 18. Furthermore, the resource manager 30 reports processing resource information to the intra resource manager 14.

Figure 3:
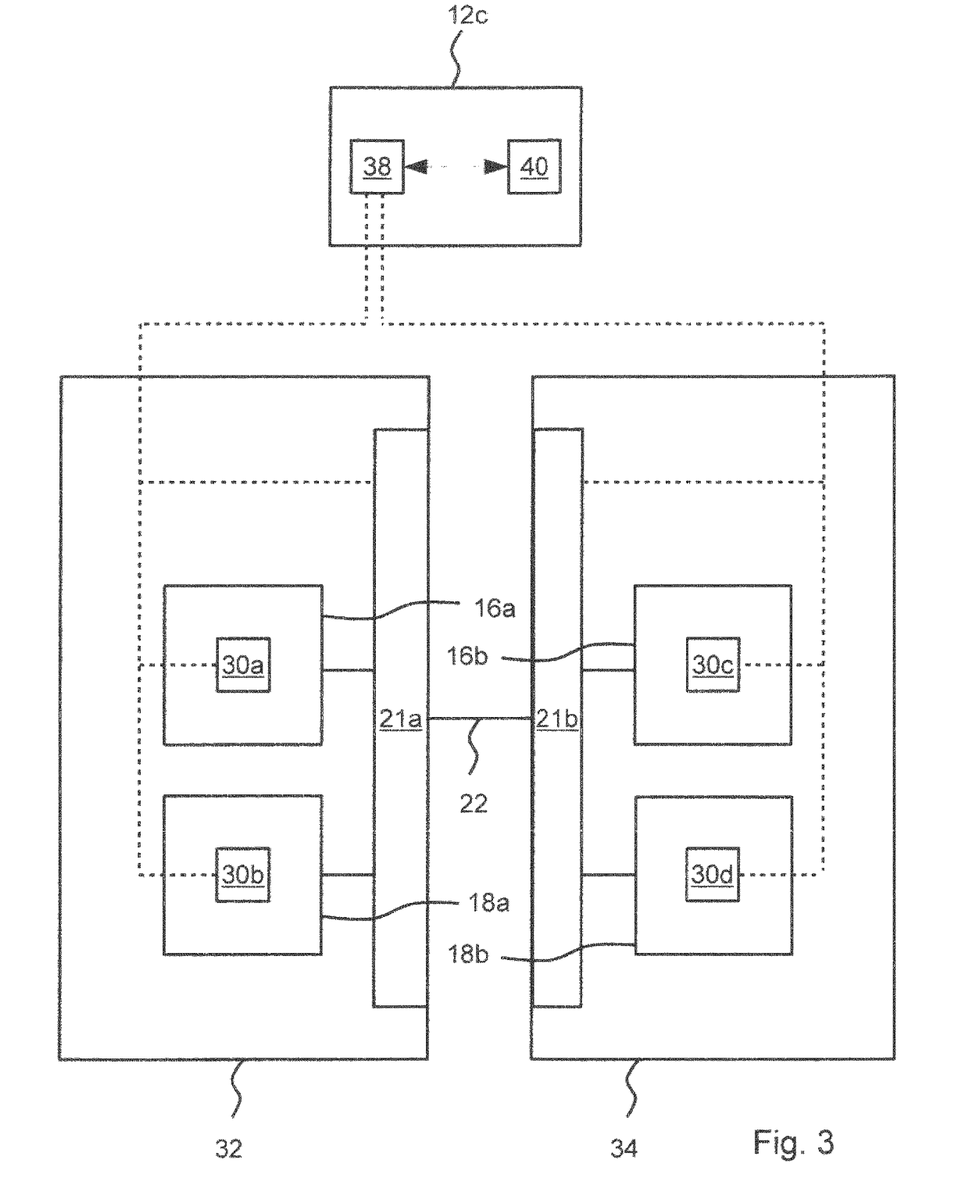
FIG. 3 is a schematic depiction of a second radio communication network.

FIG. 3 is a schematic depiction of a second radio communication network comprising two multi-site baseband units, MS-BBUs 32 and 34. A centralized cloud controller 12c comprises a resource manager 38, which is responsible for allocating resources to the BBUs 30 within a MS-BBU pool 32, 34 and between the MS-BBU pools 32, 34 via the connection 22. The centralized cloud controller 12c further comprises a database 40 for storing all information required for the decisions of the resource manager 38.

The resource manager 38 communicates with each resource manager 30 of a respective BBU 16, 18 and manages the allocation of processing capacity within a BBU 32, 34 and reports available processing resource information to the resource manager 38. The interface 21 is connected to the resource manager 38 to enable that incoming S1-U packets can be directly conveyed to the determined BBU 32, 34.

Figure 4:
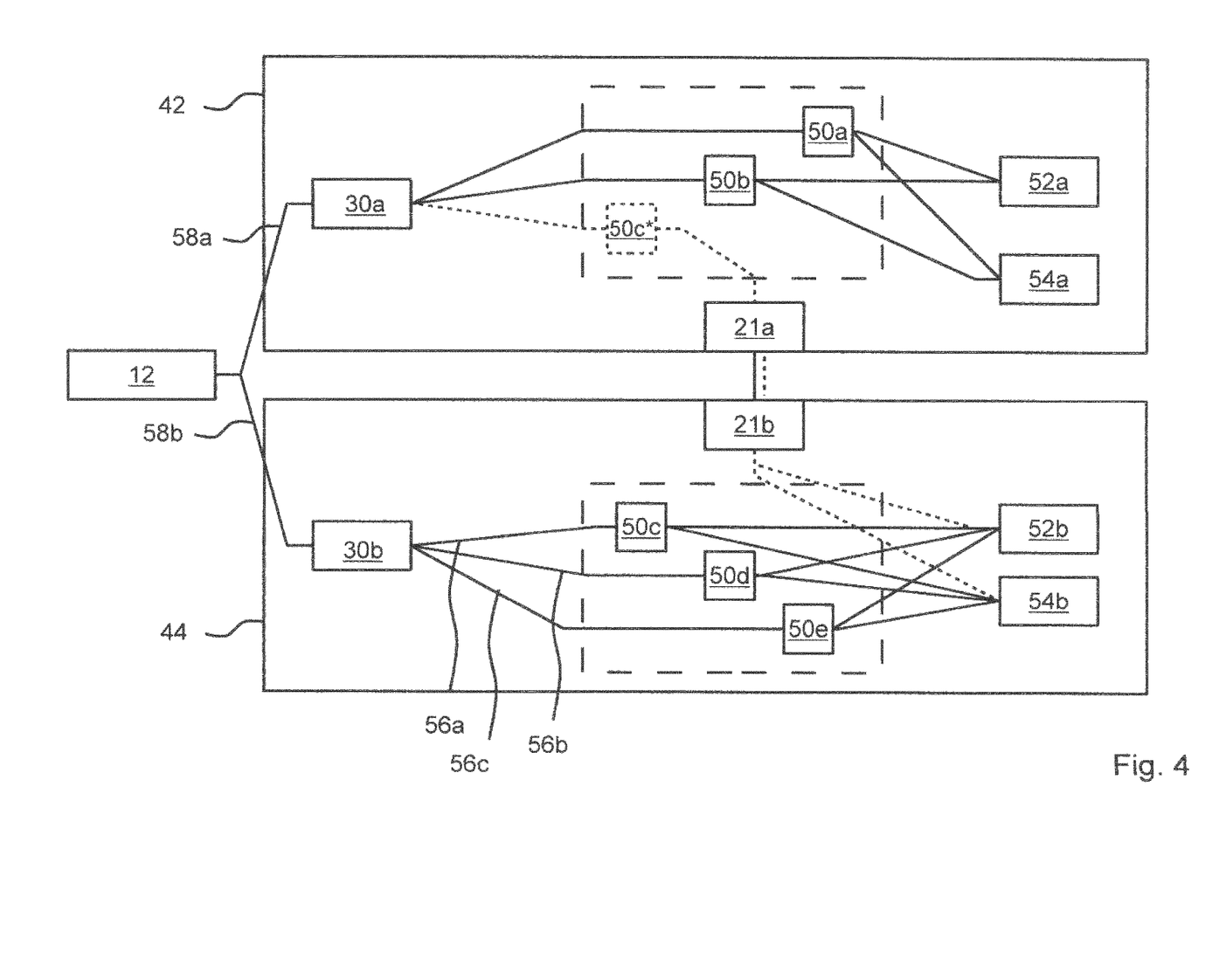
FIG. 4 is a schematic depiction of baseband units.

FIG. 4 is a schematic depiction of two BBUs 42, 44 served by a cloud controller 12. In a first embodiment the BBUs 42 and 44 are part of the same MS-BBU. In a second embodiment the BBUs 42 and 44 are part of separate MS-BBUs, respectively.

The cloud controller 12 communicates with the respective resource manager 30 of the respective BBUs 42, 44.

In an embodiment it is assumed that the BBU 42 is not in a processing capacity overload situation and the BBU 44 is in a processing capacity overload situation. This means that the BBU 44 is not able to serve all user specific functions 50 processed on it. A user specific function 50 is virtualized and may be transferred with the respective at least one bearer to another BBU. The BBU 44 has sufficient processing capacity to serve a further bearer. The user specific function 50 serves at least one bearer for the respective user equipment. A user specific function 50 comprises a user scheduler and/or a user processing. Each user specific function 50 communicates with the cell scheduler 52 and the scheduler 54. The user scheduler decides which data and/or how much data is transmitted and/or received at which time over the air interface. In an embodiment the user scheduler decides which resources of the air interface, for example which antenna(s) and/or how many resource blocks and/or which coding scheme is/are allocated for a bearer per TTI. The user processing comprises the processing of user specific data per PHYuser and/or RLC and/or MAC and/or PDCP.

In an embodiment the BBU 42 can take over a bearer from the BBU 44. A bearer served by the user specific function 50c being processed on the BBU 44 is taken off the BBU 44 in dependence on the determined processing capacity overload situation of the BBU 44. The BBU 42 takes over the bearer in form of the user specific function 50c*.

In an embodiment the BBU 42 can take over a new bearer in form of a new user specific function 50c*, the new bearer being set up or allocated in the radio communication system.

The user specific function 50c* running on the BBU 42 communicates with the cell scheduler 52b and the PHYcell scheduler 54b on the BBU 44, as the user equipment served by the user specific function 50c* communicates with the BBU 44.

The total used processing capacity is determined for a respective layer, especially a user specific physical layer and/or a medium access layer and/or a packet data convergence protocol, PDCP, layer.

The cloud controller 12 gathers processing capacity values which are sent from the respective resource managers 30 from the plurality of BBUs 42, 44. The cloud controller 12 estimates a processing capacity prediction value for the bearer prior to allocation or re-allocation. The BBU 42 is selected based on a comparison of the total processing capacity values of the plurality of BBUs 42, 44.

Each one of the BBUs 42, 44 comprises a cell scheduler 52 not specific to a user and a scheduler 54 for the lower part of the physical layer functions.

Communication paths 56 have to be served each transmission time interval, TTI. Communication paths 58 have to be served with a time interval comprising at least a plurality of TTIs.

Figure 5:
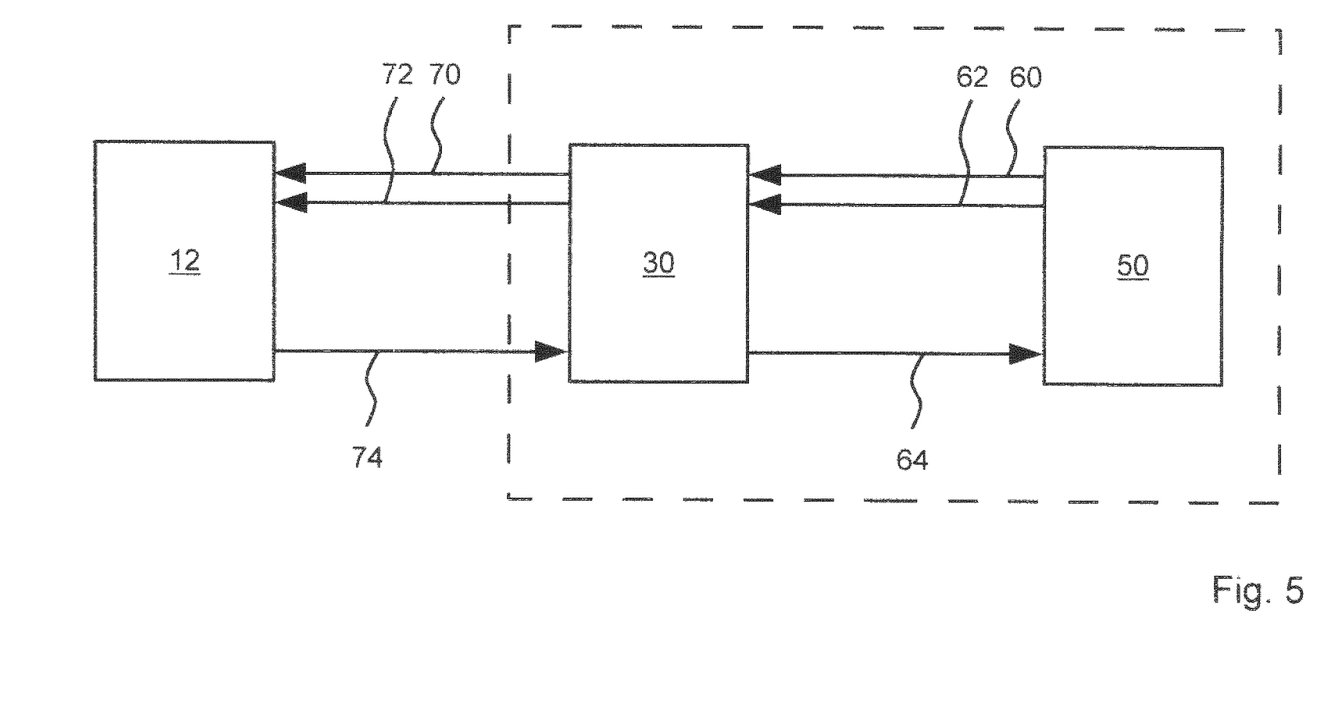
FIG. 5 is a schematic depiction of a communication scheme.

FIG. 5 is a schematic depiction of a communication scheme between the cloud controller 12 and the resource manager 30, and between the resource manager 30 and a user specific function 50. The resource manager 30 and the user specific function 50 reside on one BBU.

A first processing capacity prediction value 60 and a second processing capacity prediction value 62 are determined by the user specific function 50 for an upcoming TTI. In response to the values 60 and 62 the resource manager 30 calculates a processing capacity grant value 64. The value 64 represents a grant of a specific processing capacity to the user specific function 50 in the upcoming TTI. The value 64 is determined in dependence on the values 60 and/or 64, especially by comparing the values 60, 64 with a processing capacity threshold value, respectively.

In an embodiment the grant value 64, a positive mean standard deviation of used processing capacity of the PHY-user layer, a positive standard deviation of the used processing capacity of the second layer, a positive standard deviation of the used processing capacity of the third layer, and a positive peak/maximum standard deviation of the used processing capacity of the third layer are sent to the cloud controller 12. Furthermore, the number of downgrade steps per time window and the used processing capacity of the top x users are sent to the cloud controller 12.

In an embodiment the resource manager 30 gathers all values 60, 62 of respective user specific functions 50 and submits these values or a respective sum of the values 60, 62 of the plurality of user specific functions 50 in form of respective values 70 and 72 to the cloud controller 12.

Based on the values 70, 72 the cloud controller 12 decides, whether the BBU receives further bearers or not by a signal 74.

In an embodiment the resource manager 30 determines at least one value 70 as at least one measured processing capacity value and determines at least one value 72 as a number of downgrade steps determined during a predefined time duration.

The first values 60 represent minimum processing capacity values, which represent a minimum for executing the respective user specific function 50. The second values 62 represent optimum processing capacity values, which represent an optimum for executing the respective user specific function 50. The first values 60 and the second values 62 are calculated for each layer.

Figure 6:
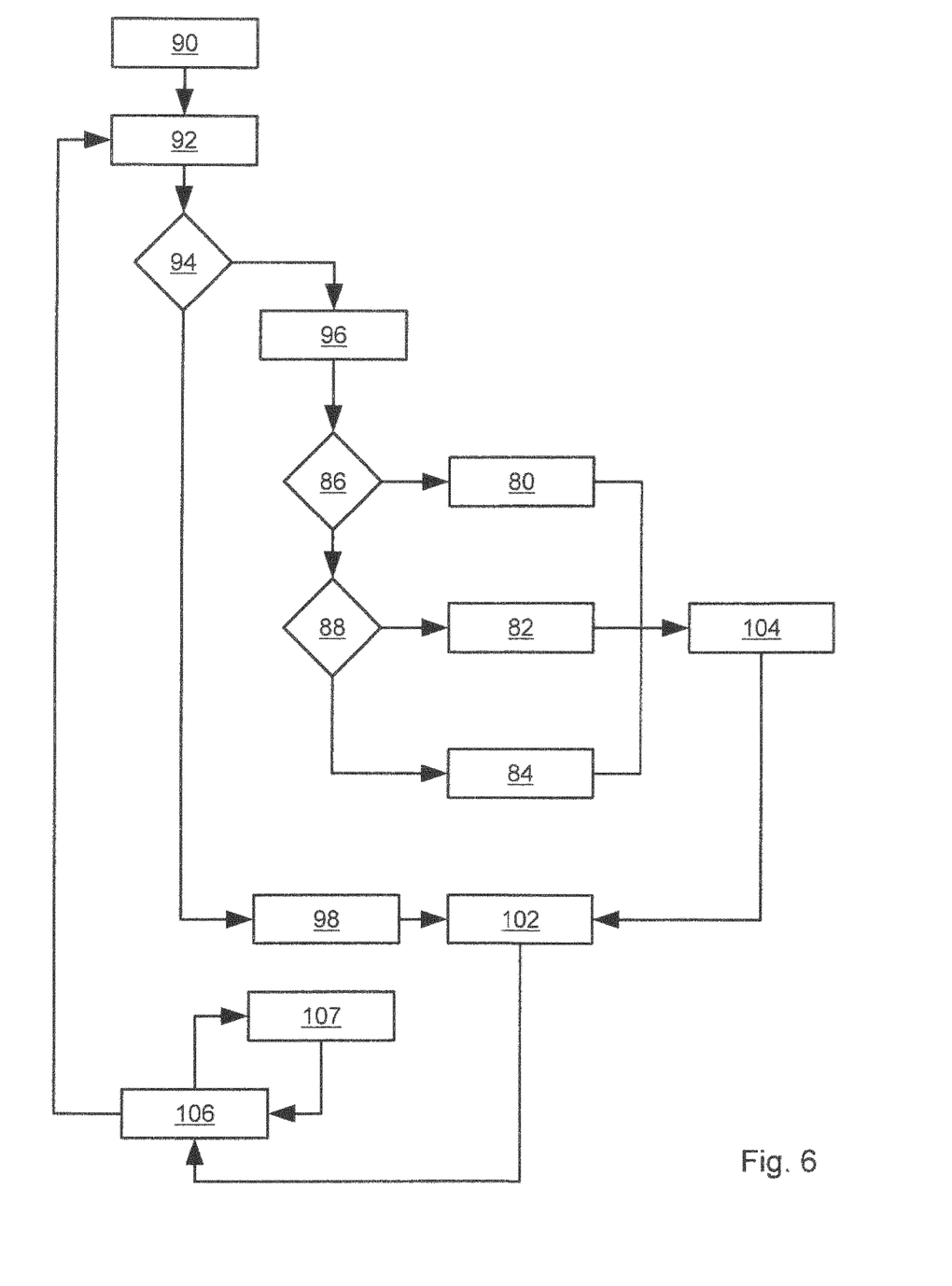
FIG. 6 is a schematic depiction of a defence method.

FIG. 6 is a schematic depiction of a defence method to be executed on the resource manager 30, wherein the method has to be executed before a beginning of the subsequent TTI. The method provides three downgrade steps 80, 82 and 84.

In the first downgrade step 80 a first group of a plurality of user specific functions 50 is granted less processing capacity than a second group of a plurality of user specific functions 50.

In an embodiment the first group comprises no guaranteed bit rate, NGBR, bearers with a respective headroom set to zero and/or the first group comprises no guaranteed bit rate, NGBR, bearers without a defined respective headroom.

In an embodiment the first group comprises no guaranteed bit rate, NGBR, bearers with a respective headroom set to a value greater than zero, the value being determined on a remaining processing capacity for NGBR bearers.

The second group comprises No Guaranteed Bit Rate, NGBR, bearers without a defined respective headroom and/or the second group comprises a Guaranteed Bit Rate, GBR, bearers and/or the bearer has a Quality of service Class Identifier, QCI, value of five.

A headroom in the context of this disclosure refers to a tolerance value, the smaller the value the higher the priority for the respective metric. For example a headroom of zero has the meaning that the respective bearer or user specific function has to be served immediately. The headroom is connected to a metric like delay or bit rate. A headroom is determined in the context of past experience of the metric, a set point value for the respective metric, and a current value of the metric.

According to the first downgrade step 80 no processing capacity is granted to a user specific function 50 if the user equipment is assigned to a NGBR bearer and a respective headroom is zero. A value 64 is granted equal to estimated second processing capacity to the user specific function 50 if the bearer is a NGBR bearer and there is no headroom defined. It is granted a capacity with a value between the estimated first processing capacity value and the estimated second processing capacity value if the bearer is a GBR bearer and/or the bearer has a QCI value of five. However, the term user and bearer may be used interchangeably according to this description.

The first downgrade step 80 is executed according to a query 86 if a processing load threshold value A is equal or greater than a first total processing capacity, which is determined based on the first processing capacity values 60 and/or the processing load threshold value A is less than a second total processing capacity, which is determined based on the second processing capacity values 62.

According to an embodiment of the query 86 it is checked whether the overload threshold A will be exceeded in the upcoming TTI, i.e. either with $P_{PHYuser}^{opt}>A$ and/or with $P_{L2}^{opt}>A$, the resource manager 30 first calculates the minimum needed BBU capacity for the upcoming TTI with minimum processing capacity values for PHYuser and for layer 2. Now, the resource manager 30 checks whether the minimum needed BBU capacity already falls below the overload threshold A with $P_{PHYuser}^{min} \leq A$ and $P_{L2}^{min} \leq A$.

According to the second downgrade step 82 a third group of user specific functions 50 is granted less processing capacity than a fourth group of user specific functions 50. The third group comprises NGBR users which have a QCI value other than five. The fourth group comprises NGBR users which have a QCI value of five and/or the fourth group comprises GBR users.

The second downgrade step 82 is executed according to a query 88 if a total processing capacity of the first processing capacity values 60 of GBR users and/or of users with a QCI value of five is less than or equal to the processing load threshold value A.

According to an embodiment of the query 88 it is checked whether there is enough BBU capacity available at least for GBR and QCI5 bearers according to $P_{PHYuser}^{min}>A$ and/or $P_{L2}^{min}>A$, i.e. if $P_{GBR}^{min}+P_{QCI5}^{min} \leq A$. If this is the case, the resource manager continues with step 82 otherwise with step 84.

The second downgrade step 82 comprises: granting no processing capacity if the respective user/bearer is a NGBR user and has a QCI value other than five, and/or granting processing capacity with a value between the estimated first processing capacity and the estimated second processing capacity if the user is a GBR user or a NGBR user with a QCI value of five.

In the third downgrade step 84 a fifth group of user specific functions 50 is granted less processing capacity than a sixth group of user specific functions 50. The fifth group comprises NGBR users with a QCI value other than five, and the sixth group comprises users with a QCI value of five and/or the sixth group comprises GBR users.

The third downgrade step 84 is executed according to the query 88 if a total processing capacity of the first processing capacity values of GBR users and/or users with a QCI value of 5 is greater than a processing load threshold value A.

According to the third downgrade step it is granted no processing capacity if the user is a NGBR user and has a QCI value other than five, and/or it is granted a processing capacity with a value below of the first processing capacity if the user is a GBR user or a NGBR user with a QCI value of five. After the third downgrade step the granted processing capacity 64 is less than or equal to the first processing capacity value 62 representing the minimum processing capacity.

In general, the granted processing capacity 64 is less than or equal to the second processing capacity value 60, and the second processing capacity value 62 is less than the first processing capacity value 60.

The first and second processing capacity values 60 and 62 are determined by the user specific function 50 depending on a number of physical resource blocks, PRBs, used for the user equipment of the user specific function 50 per TTI, and/or based on the type of the modulation and coding scheme, and/or based on an antenna mapping, and/or based on an Quality of Experience Class Identifier, QCI, and/or based on a measured age of packets in a radio link control buffer, and/or based on a measured delay, and/or based on a minimum bit rate guaranteed. The values 60 and 62 may be obtained from a database or obtained via a formula.

In a block 90 the first and second values 60 and 62 are received from the plurality of user specific functions 50.

In a block 92 the second values 62 are summed up for a plurality of user specific functions 50. The first total value 70 is determined based on a plurality of first values 60. The second total value 72 is determined on a plurality of second values 62. The first and second total values are determined per layer.

According to a query 94 it is determined whether the second total value 72 for each layer does exceed a respective threshold value. If one of the second total values exceeds the threshold value the first total values 70, representing the total minimum capacity value to execute all user specific functions 50, per layer are determined according to a block 96.

If both of the second total values 72, representing the total optimum value, respectively, do not exceed the respective threshold values, a block 98 grants the second capacity values to all user specific functions 50 as sufficient processing capacity is available in the BBU.

According to a block 102 internal statistics of the resource manager 30 are updated. These internal statistics are sent to the cloud controller 12 according to a block 107. Per layer a mean and variance/standard deviation of the used processing capacity are calculated by the local resource manager 30 in a predefined time interval, wherein the mean and variance/standard deviation are averaged in the time interval.

After finishing the respective downgrade step 80, 82, 84 the processing grants are sent to the schedulers 50 according to a block 104. According to a block 106 the resource manager 106 resides in a wait mode.

In an embodiment the cloud controller 12 receives the used processing capacity of the BBU per layer, the defence statistics including a number of downgrade steps executed per time interval, and a used processing capacity of the top x users, which is explained in detail afterwards. The top x users should comprise a predefined percentage value, for example 30%, of the layer 3 processing capacity which is for example the mean average plus the maximum positive deviation.

In the wait mode 106 the resource manager 30 receives the first and second values 60, 62 from the user specific functions 50 and calculates the occupied BBU capacity for the upcoming TTI. Summing up the optimum processing capacity values 62 for all GBR and NGBR UPs for PHYuser and for layer 2 result in respective total second values. The resource manager 30 then checks whether the occupied BBU capacity exceeds an overload threshold A for the PHYuser layer and/or for the second layer, especially the medium access control layer. If the overload threshold A will not be exceeded in the upcoming TTI, the resource manager 30 will confirm the optimum processing effort values for all user specific functions 50 according to block 98 and updates internal statistics regarding occupied BBU capacity, defence statistics, load information for selected UPs and UP characteristics. The resource manager 30 updates the mean and variance of the occupied BBU capacity each TTI according to a predefined averaging window according to block 102. The defence statistics indicate at least the number of necessary modifications according to steps 80, 82 and 84. Beyond this certain user specific function 50 characteristics are of interest. It is at least necessary to know whether the user specific function 50 comprises a GBR or a NGBR bearer.

According to an embodiment the following information about used processing capacity, wherein the information about used processing capacity is also referred to as measured processing capacity value, is delivered in a predefined time distance, aligned to a time window of e.g. 0.5 sec, to the cloud controller 12:

average used processing capacity $\mu^{PHYuser}$ per BBU for a predefined time window average positive deviation of the used processing capacity $$\sigma_+^{PHYuser} = \frac{1}{N}\sum_{i=1}^{N}(x_i^{PHYuser} - \mu^{PHYuser}) \text{ if } x_i^{PHYuser} - \mu^{PHYuser} > 0$$

and with and for all N occurring during a predefined time window average used processing capacity $\mu^{Layer2}$ per BBU for a predefined time window average positive deviation of the used processing capacity $$\sigma_+^{Layer2} = \frac{1}{N}\sum_{i=1}^{N}(x_i^{Layer2} - \mu^{Layer2}) \text{ if } x_i^{Layer2} - \mu^{Layer2} > 0$$

and with and for all N occurring during a predefined time window average used processing capacity $\mu^{Layer3}$ per BBU for a predefined time window maximum positive deviation of the used processing capacity $$\sigma_{max}^{Layer3} = \max_{i \in N}(x_i^{Layer3} - \mu^{Layer3}) \text{ with } x_i^{Layer3} - \mu^{Layer3} > 0$$

for all N occurring during a predefined time window.

According to an embodiment for the user specific physical layer PHYuser, layer 2 and layer 3 the resource manager 30 reports the used processing capacity of the top x users, n=1, . . . , x, according to averaged processing usage $\mu_{UP_n}^{PHYuser}$, n=1, . . . , x, or PHYuser part in the BBU during the predefined average window in % average positive deviation $\sigma_{+UP_n}^{PHYuser}$, n=1, . . . , x, of PHYuser processing usage during the predefined average window in % averaged processing usage $\mu_{UP_n}^{Layer2}$, n=1, . . . , x, or layer 2 part in the BBU during the predefined average window in % average positive deviation $\sigma_{+UP_n}^{Layer2}$, n=1, . . . , x, layer 2 processing usage during the average window in % averaged processing usage $\mu_{UP_n}^{Layer3}$, n=1, . . . , x, for layer 3 during the predefined average window in % maximum positive deviation $\sigma_{maxUP_n}^{Layer3}$, n=1, . . . , x, of layer 3 processing usage during the average window in %.

If the overload threshold A will be exceeded in the upcoming TTI according to the query 94, the resource manager 30 first calculates the minimum needed BBU capacity for the upcoming TTI with minimum processing effort values for PHYuser and for layer 2. Then the resource manager 30 checks whether the minimum needed BBU capacity already falls below the overload threshold A.

According to an embodiment the query 94 checks whether the occupied BBU capacity exceeds an overload threshold A for the PHYuser with $P_{PHYuser}^{opt}>A$ and/or for the layer 2 with $P_{L2}^{opt}>A$. If the overload threshold A will not be exceeded in the upcoming TTI, i.e. $P_{PHYuser}^{opt}\leq A$ and $P_{L2}^{opt}\leq A$, the resource manager 30 will confirm the optimum processing effort values to the user specific functions 50.

The description and drawings merely illustrate the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for operating a radio communication network or a network element thereof, comprising: determining a bearer to be processed in the radio communication network; selecting a baseband unit, BBU, out of a plurality of BBUs, which satisfies at least one property of the bearer; and placing the bearer on the selected BBU for processing,
   wherein the determination of the bearer comprises:
      determining a processing capacity overload situation of a further BBU;
      determining the bearer being processed on the further BBU to be taken off the further BBU in dependence on the determined processing capacity overload situation of the further BBU,
      wherein the determination of the processing capacity overload situation comprises:
      executing one or more processing capacity downgrade steps of at least one user specific function on the further BBU;
      determining the processing capacity overload situation depending on a number of processing capacity downgrade steps executed.

2. The method according to claim 1, wherein at least one of the downgrade steps comprises:
   granting less processing capacity to a first group of user specific functions than to a second group of user specific functions.

3. The method according to claim 1,
   wherein a total used processing capacity is determined, and
   wherein one of the downgrade steps is executed based on a comparison of the total used processing capacity with a threshold value.

4. The method according to claim 3, wherein the total used processing capacity is determined for a respective layer comprising one of a user specific physical layer, a medium access layer, a packet data convergence protocol, PDCP, layer, and a radio link control, RLC, layer.

5. The method according to claim 1, comprising:
   determining a first processing capacity prediction value for the at least one user specific function on the further BBU and for an upcoming transmission time interval, TTI,
   determining a second processing capacity prediction value for the at least one user specific function and for the upcoming transmission time interval, TTI,
   granting a processing capacity value to a user specific function based on the first and second processing capacity prediction values.

6. The method according to claim 5, wherein the granted processing capacity is less than or equal to the second processing capacity prediction value, and wherein the first processing capacity prediction value is less than the second processing capacity prediction value.

7. The method according to claim 5, wherein the first and second processing capacity prediction values are determined based on a number of physical resource blocks, PRBs, used for the user equipment of the user specific function per TTI, based on the type of the modulation and coding scheme, and/or based on an antenna mapping, based on an Quality of Experience Class Identifier, QCI, and/or based on a measured age of packets in a radio link control buffer, and/or based on a measured delay, based on a maximum packet loss rate guaranteed, or based on a minimum bit rate guaranteed, respectively.

8. The method according to claim 1, wherein the property of the bearer comprises latency between a user equipment associated with the bearer and the BBU, a guaranteed bit rate, GBR, a Quality of Service, QoS, Class Indicator, QCI, an end to end, E2E, packet drop rate, or a priority.

9. The method according to claim 1, wherein the selection of the BBU comprises:
   gathering total processing capacity values from the plurality of BBUs,
   determining a processing capacity prediction value for the bearer on a cloud controller, and
   selecting the BBU based on a comparison of the total processing capacity value of the plurality of BBUs and the processing capacity prediction value for the bearer.

10. Network element for a radio communication network, wherein the network element is operable for, via a processor, determining a bearer to be processed in the radio communication network; for selecting a baseband unit, BBU, out of a plurality of BBUs, which satisfies at least one property of the bearer; and for placing the bearer on the selected BBU for processing,
   wherein the determination of the bearer comprises:
      determining a processing capacity overload situation of a further BBU;
      determining the bearer being processed on the further BBU to be taken off the further BBU in dependence on the determined processing capacity overload situation of the further BBU,
      wherein the determination of the processing capacity overload situation comprises:
      executing one or more processing capacity downgrade steps of at least one user specific function on the further BBU;
      determining the processing capacity overload situation depending on a number of processing capacity downgrade steps executed.

11. Network element according to claim 10, wherein the network element is configured to execute a method wherein at least one of the downgrade steps comprises granting less processing capacity to a first group of user specific functions than to a second group of user specific functions.

12. Network element according to claim 10, wherein the network element is a Baseband Unit, BBU, or a Cloud Controller.

13. Radio communication network comprising a network element according to claim 10.

* * * * *